July 27, 1926.　　　　F. B. FARMER　　　　1,593,713
FLUID PRESSURE BRAKE
Filed August 20, 1925
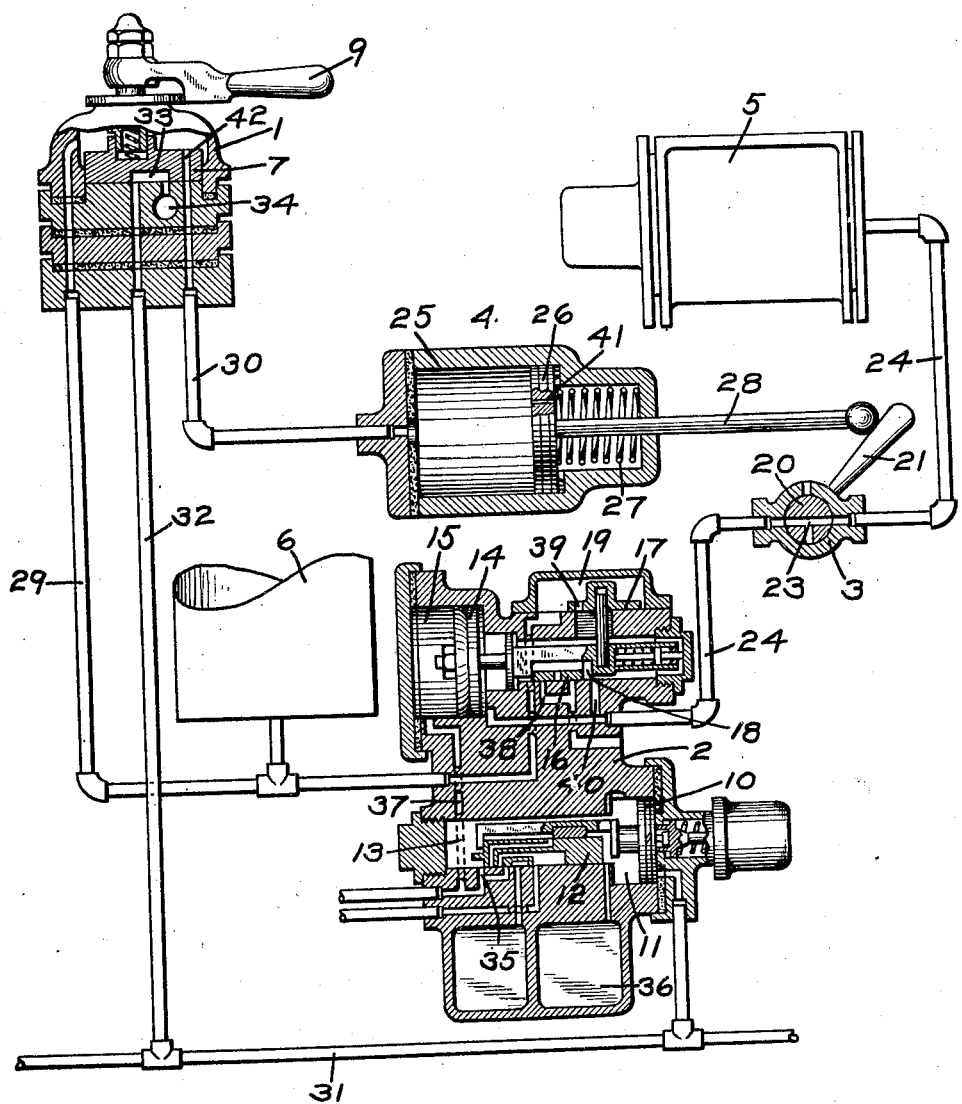
INVENTOR
FRED B. FARMER
BY Wm. M. Cady
ATTORNEY Patented July 27, 1926.

1,593,713

UNITED STATES PATENT OFFICE.

FRED B. FARMER, OF ST. PAUL, MINNESOTA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed August 20, 1925. Serial No. 51,321.

This invention relates to fluid pressure brakes and more particularly to a locomotive brake equipment.

When trains are operated down long, steep grades, requiring the more or less continuous use of the brakes, if the brakes on the engine are allowed to operate with the train brakes, such use is liable to result in the overheating of the driver wheel tires and the consequent loosening of same, a dangerous condition.

In order to avoid this, it is customary to install a manually operated cut-out cock, by the manipulation of which the engineer may cut out the driver brake when desired. When an emergency application of the brakes is effected, however, it is desirable that the maximum braking power be obtained and including that of the driver brakes, and consequently the engineer should move the cut-out cock to its open position before making an emergency application of the brakes. It is possible that the engineer may fail to do this, with the result that the driver brakes will not be applied. It is also possible that an emergency application of the brakes may be effected from the train by operation of the usual conductor's valve, in which case, if the cut-out cock be in closed position, the same condition will result.

The principal object of my invention is to provide means, operating automatically in the event an emergency application of the brakes is effected, for ensuring that the driver brakes will be applied, in case the cut-out cock should be closed.

In the accompanying drawing, the single figure is a diagrammatic view, partly in section, showing a fluid pressure brake equipment for a locomotive and embodying my invention.

As shown in the drawing, the equipment may comprise a brake valve device 1, a distributing valve device 2, a cut-out cock 3, an operating device 4, a brake cylinder 5 and a main reservoir 6.

The brake valve device 1 may comprise a casing containing a rotary valve 7, said rotary valve being adapted to be operated by an operating handle 9 which is suitably attached to the rotary valve stem.

The distributing valve device 2 is of the type used in connection with the well known E T locomotive brake equipment and comprises the usual equalizing portion, having a piston 10 contained in a piston chamber 11 and adapted to operate a slide valve 12 contained in valve chamber 13, and also the usual application portion having a piston 14 contained in piston chamber 15 and adapted to operate slide valves 16 and 17 contained respectively in valve chambers 18 and 19.

The cut-out cock 3 may comprise a cock body containing a plug valve 20, which is adapted to be operated by a handle 21 and is provided with a three-way passage 23 adapted in one position of said plug valve to establish communication through pipe 24, which connects the driver brake cylinder 5 with the distributing valve device 2, and in another position to cut off said connection and to connect the brake cylinder 5 to atmosphere.

The operating device 4 may comprise a cylinder 25 containing a piston 26 subject on one side to the pressure of fluid supplied to the cylinder 25 and on the opposite side to the pressure of a coil spring 27, said piston having a piston rod 28 with a ball end. The cylinder 25 is mounted in a position so that the piston rod 28 is in alinement with the handle 21 of cut-off cock 3.

If the engineer wishes to cut out the driver brake from operation, he moves the cut-out cock to its cut-out position, in which the driver brake cylinder 5 is cut off from the distributing valve device 2 and said brake cylinder is connected to atmosphere by three-way passage 23, so that when the brake valve device is operated to effect a service application of the brakes, the driver brake cylinder 5 will not be supplied with fluid under pressure through pipe 24.

If the engineer wishes to effect an emergency application of the brakes by operation of the brake valve device and neglects to turn the cock handle 21 to open position, upon movement of the rotary valve 7 to emergency position, fluid under pressure from the main reservoir 6, which is always supplied to the top of rotary valve 7, through pipe and passage 29, flows through a registering port 42 in the rotary valve to passage and pipe 30 and thence to cylinder 25, where it acts to shift piston 26 and consequently piston rod 28 outwardly. As piston rod 28 moves outwardly its ball end engages the handle 21 of cut-out cock 3, moving it and consequently plug valve 20 to a position in which communication through pipe 24 is established by means of passage 23 in said plug valve.

With the brake valve handle 9 in emergency position, brake pipe 31 is connected to atmosphere by way of pipe and passage 32, cavity 33 in rotary valve 7, and atmospheric exhaust port 34, causing the piston 10 and consequently slide valve 12 of the equalizing portion of the distributing valve device 2 to be shifted to emergency position, in which passage 35 is uncovered, permitting fluid under pressure from valve chamber 13 and pressure chamber 36 to flow through passages 35 and 37 to application piston chamber 15.

The pressure of fluid so supplied to piston chamber 15 acts to shift piston 14 inwardly, which, in turn, shifts slide valve 16 to a position in which exhaust passage 38 is cut off from valve chamber 18, and slide valve 17 to a position in which fluid under pressure from valve chamber 19 and the main reservoir 6 flows through port 39 in slide valve 17, valve chamber 18, passage 40 and pipe 24 to brake cylinder 5, thereby applying the driver brakes.

A small passage 41 is provided in piston 26, so that when the brake valve handle 9 is moved back to another position and the passage and pipe 30 is consequently blanked, the fluid under pressure trapped in cylinder 25 may escape to atmosphere around piston rod 28, thereby permitting the spring 27 to shift piston 26 to its innermost position.

Having now described my invention, what I claim as new and desire to secure by Letters Patent, is:—

1. In a fluid pressure brake, the combination with a brake valve device, a brake cylinder, and a cock for controlling communication through which fluid under pressure is supplied to the brake cylinder, of means operated upon movement of said brake valve device to effect an emergency application of the brakes for operating said cock to open said communication.

2. In a fluid pressure brake, the combination with a brake valve device, a brake cylinder, and a manually operated cock for cutting off communication through which fluid under pressure is supplied to the brake cylinder, of means controlled by said brake valve device for shifting said cock from its cut-off position.

3. In a fluid pressure brake, the combination with a brake application valve device and a brake cylinder, of a cock for controlling communication from said valve device to said brake cylinder, and means operated upon an emergency application of the brakes for shifting said cock from closed to open position.

4. In a fluid pressure brake, the combination with a brake pipe and a brake valve device having an emergency application position for effecting a sudden reduction in brake pipe pressure, of a brake cylinder, a valve device for controlling the supply of fluid under pressure to the brake cylinder, a cock for controlling communication from said valve device to said brake cylinder, and means operated upon movement of said brake valve device to emergency position for shifting said cock to a position in which communication is open from said valve device to said brake cylinder.

5. In a fluid pressure brake, the combination with a brake pipe and a brake valve device having an emergency application position for effecting a sudden reduction in brake pipe pressure, of a brake cylinder, a valve device operated upon a reduction in brake pipe pressure for supplying fluid under pressure to the brake cylinder, a cock for controlling communication through which said valve device supplies fluid to the brake cylinder, and means operated upon movement of said brake valve device to emergency position for shifting said cock from its closed position to its open position.

6. In a fluid pressure brake, the combination with a brake cylinder, of a cock for controlling communication through which fluid under pressure is supplied to the brake cylinder, a handle for operating said cock, a piston operated by fluid under pressure for operating said handle, and a brake valve device having a position for supplying fluid under pressure to said piston.

In testimony whereof I have hereunto set my hand.

FRED B. FARMER.